Nov. 10, 1931.  L. M. PERSONS  1,831,464
THERMO ELECTRIC CONTROL VALVE
Filed Feb. 25, 1928   2 Sheets-Sheet 1

Inventor:
Laurence M. Persons
By Jones, Addington, Ames & Seibold
Attys.

Patented Nov. 10, 1931

1,831,464

UNITED STATES PATENT OFFICE

LAWRENCE M. PERSONS, OF CHICAGO, ILLINOIS, ASSIGNOR TO COOK ELECTRIC COMPANY, OF CHICAGO, ILLINOIS, A CORPORATION OF ILLINOIS

THERMO-ELECTRIC CONTROL VALVE

Application filed February 25, 1928. Serial No. 256,960.

My invention broadly relates to temperature controlling devices and more particularly to electro-thermostatic devices for operating valves, dampers, or the like, of heating systems.

The operating movement of devices of this type is usually obtained through the movement of a thermal element. It is common practice to employ a volatile substance for moving the thermal element and to control such movement by a time limit switch. I have found, however, that controlling the movement of the thermal element, whether by a time limit switch or otherwise, is a difficult matter.

The difficulty experienced is in the timing of the switch to open the circuit as the thermal element operates the control device. An increase of pressure by the volatile substance, after the control device operates, is apt to rupture or strain the thermal element or adjacent parts. Obviously, with the device adapted for operating control devices of different movements, such as valves, dampers, etc., the thermal element must likewise be capable of different movements. Accordingly, attempts have been made to secure timed operation of the switch, or to predetermine the quantity of volatile fluid employed, whereby to secure a predetermined limit of movement under given heat conditions. However, such varying factors as size, thickness and resiliency of the metal and the area of radiation of the thermal element, render such determinations practically impossible, at least to the extent of securing a thermal unit universally adaptable to such control devices. Time limit switches are generally undesirable due to their constant action of opening and closing the circuit to control the movement of the thermal element while the thermostatic circuit is closed. Such action results in a fluttering movement and momentary operation of the control device, which is objectionable particularly where a valve is employed for controlling the flow of a heat medium, or a damper for controlling the draft of a furnace.

An object of my invention resides, therefore, in the provision of a universally adaptable thermal element capable of operating within a predetermined range of movement and of actuating the control device within this range of movement, without the use of a time limit switch and without requiring the circuit to open so as to discontinue movement of the thermal element as the control device is actuated. Accordingly, the thermal element compensates for any variation in the stroke of the control device and may continue to move after the control device is actuated without rupturing or straining itself or adjacent parts.

A further object is to provide a yieldable or lost motion connection between the thermal element and the control device to be actuated whereby after the control device is actuated, or seated as in the case of a valve, the thermal element may continue to move without imparting motion to the control device.

Although any form of thermal element may be employed, I preferably provide a fluid pressure motor applying pressure externally on a contractible and expansible wall, which wall may be provided in the form of a bellows, if so desired. The application of pressure externally advantageously prolongs the life of the bellows, inasmuch as the external pressure does not stretch or tend to distort the metal of the bellows, as in the case of internal pressure.

More specifically, the device comprises a closed pressure chamber having a bellows extending inwardly and arranged to be expanded under normal conditions, but to be contracted by an increase of pressure in the chamber when the current flows through a heat coil carried by a heating element communicating with the chamber. Contraction of the bellows operates against a control device, such as a valve, to seat the same. In the present disclosure, a spring is provided to hold the valve normally unseated, and, as a consequence, the action of the bellows, when contracting, overcomes the spring and seats the valve.

Further or continued contraction of the bellows, caused by the increasing pressure of the expanding volatile substance, overcomes 100 a yieldable or lost motion connection between the bellows and the valve seat, so that, with the valve seated, it is possible for the bellows to continue moving without causing the increasing pressure in the chamber to rupture the bellows, or any of the connecting parts. Obviously, it will be observed that my invention provides an electro-thermostatic device which may be provided with a continuously closed heating circuit during the operation of the control device, and which may be allowed to continue moving under the influence of the heat developed by the closed circuit, after the control device is operated.

In order to apprise those skilled in the art how to construct and practice my invention, I shall now describe a preferred embodiment thereof in connection with the accompanying drawings which form a part hereof.

In the drawings:

Fig. 3 is a similar view, with a portion broken away, showing the manner in which the heat motor may continue to move after the valve is seated.

Figure 1:
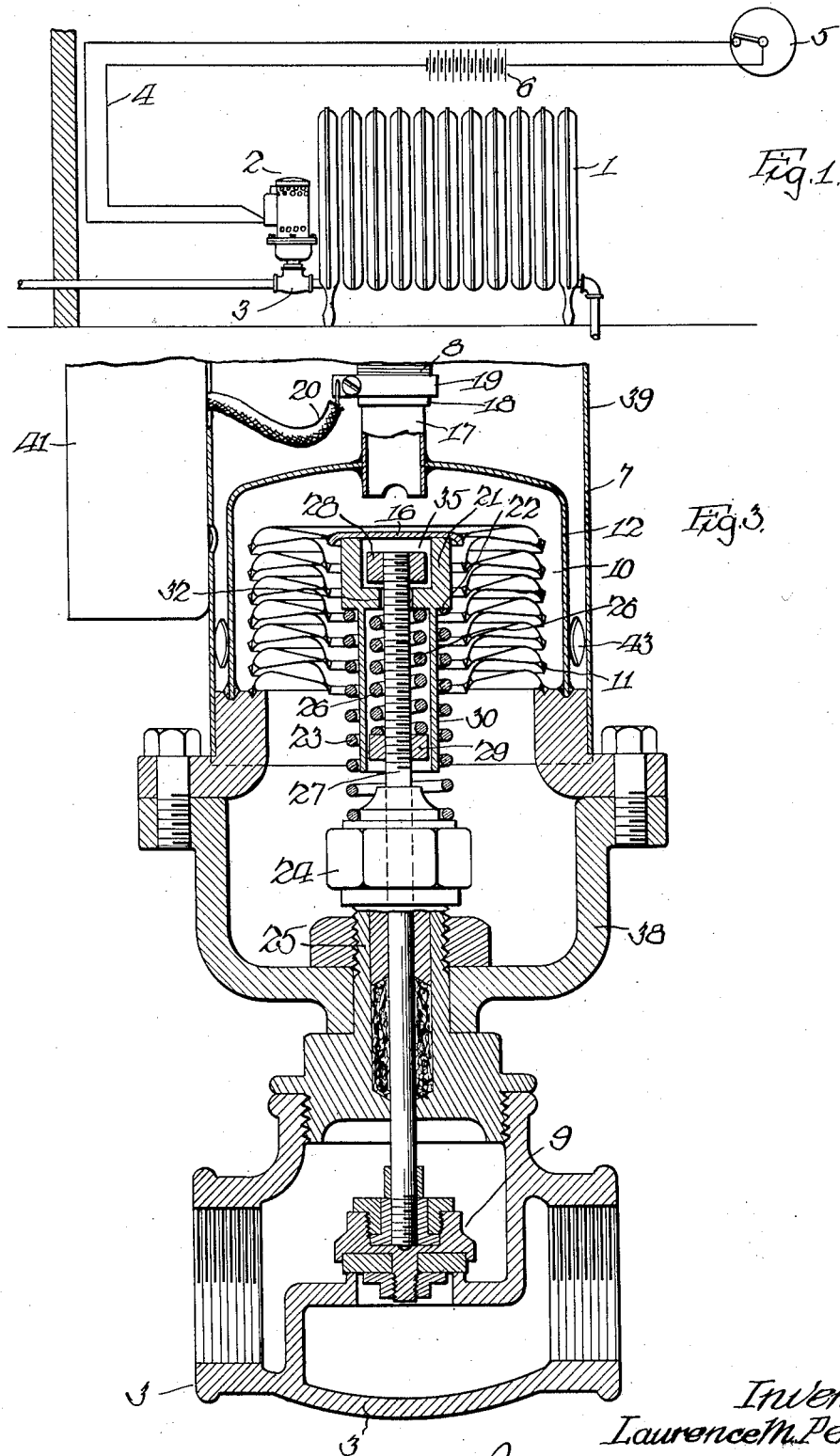
Figure 1 is a diagrammatic illustration of a heating system incorporating an electro-thermostatic device embodying the invention.

It will be understood at the outset that the invention is capable of adaptation to different forms of control devices and is not to be limited to the control of the valve, such as is shown in the drawings. It will be obvious from the following description that the heat motor may be connected in any suitable circuit and arranged to actuate different control devices without in any way changing its operation, function or utility.

As shown in the accompanying drawings, more particularly in Fig. 1, electro-thermostatic device 2 may be employed to control the inlet valve of the usual heat radiator 1. Electro-thermostatic device 2 is mounted to cooperate with the inlet valve connection 3 and to be connected in a thermostatic circuit 4 provided with thermostat 5 and a suitable source of current supply 6.

Electro-thermostatic device 2 comprises essentially a thermal element 7 arranged to be influenced by the heat developed by the current flow through a heat coil 8 connected in thermostatic circuit 4. As the temperature rises thermal element 7 moves to seat an inlet valve 9 arranged in valve connection 3.

Figure 2:
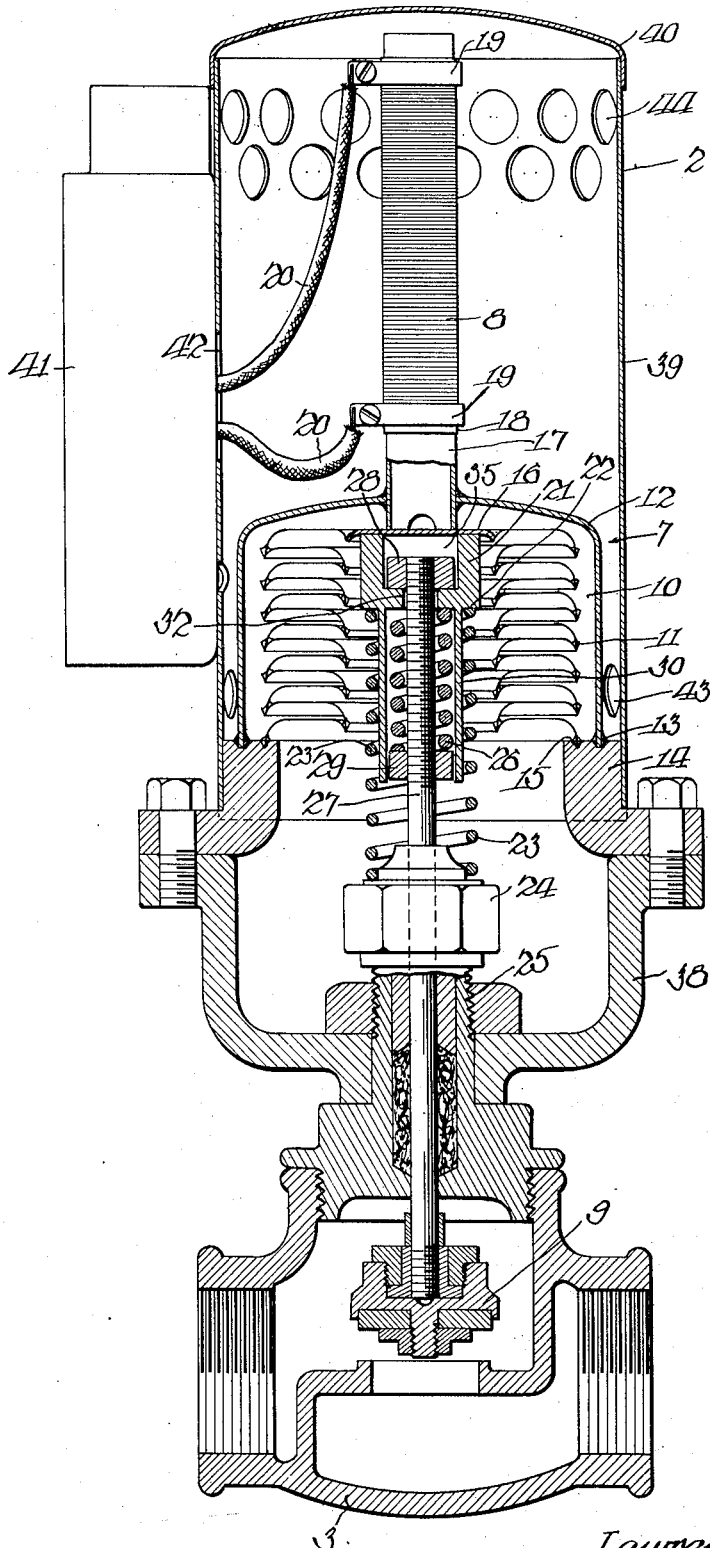
Fig. 2 is an enlarged vertical sectional view of the electro-thermostatic device showing the valve in open position.

Thermal element 7 is preferably in the form of a fluid pressure motor comprising a pressure chamber 10 and an expansible and contractible wall 11 extending into this chamber and subject to the pressure therein. A housing 12 is suitably secured at 13 to a ring plate 14 forming a base. This housing cooperates with the expansible and contractible wall 11 to provide chamber 10. Expansible and contractible wall 11 may be in the form of the usual well known bellows, either of the corrugated or sectionalized type, having its lower end secured at 15 to plate 14. The upper end of bellows 11 has a plate 16 secured thereto, this end being movable by contraction of the bellows as the result of increasing pressure in chamber 10. A heating element in the form of a tube 17 projects into the top wall of casing 12 and is hermetically sealed thereto. Tube 17 communicates with pressure chamber 10 and is adapted to have heat coil 8 suitably wound therearound, as indicated in Fig. 2. Any suitable insulation material, such as mica 18, is first wound about tube 17 to insulate the coil from the tube. Terminal bands 19 may then be suitably attached to the ends of the mica 18 to hold the same and the coil in position, and also to receive the conductors 20 of thermostatic circuit 4.

Any suitable volatile substance, such as a fluid, is inserted in chamber 10. While the thermostatic circuit is open and no heat is being generated at the heat coil 8, that is to say, when the device is in normal position, this volatile fluid extends upwardly into tube 17. When the thermostatic circuit 4 is closed by thermostat 5, the flow of current through heat coil 8 will develop heat and thereby drive and force the volatile fluid out of tube 17 and into chamber 10. I find that the arrangement of tube 17 advantageously limits the expansion of the volatile fluid after it is driven into pressure chamber 10. There is a tendency for the heat developed to travel radially into the tube and very little tendency to travel longitudinally downwardly along the tube. Consequently, it will be seen that after the volatile fluid is driven into pressure chamber 10, only such heat as will be necessary to keep the volatile fluid in the pressure chamber 10 will be effectively transferred along the tube to the upper part of housing 12. By driving the volatile fluid into pressure chamber 10, a pressure is exerted against the upper movable wall of bellows 11. This pressure overcomes the normal resiliency of the bellows to remain in extended position. The bellows is thereby contracted and moved downwardly whereby to depress a hollow collar or member 21 having a shoulder 22 engaging against a coil spring 23.

A yieldable or lost motion connection may be provided between bellows 11 and inlet valve 9 for seating the valve as the bellows contracts, and thereafter, for permitting the bellows to continue contracting until the volatile fluid is driven out of the heating tube 17 into pressure chamber 10, or until such time as the heat developed at the heat coil 8 is ineffective to cause the volatile fluid to further increase the pressure within the chamber. It may be mentioned that I do not contemplate being limited to the arrangement of the heating element 17 with reference to its relation to pressure chamber 10 in order that a condition may be obtained where the volatile fluid will no longer be influenced by the heat to increase the pressure, inasmuch as the present invention mainly relates to the aforesaid lost motion or yieldable connection between the bellows and the valve. This yieldable or lost motion connection may comprise coil spring 23 and a second coil spring 26 of relatively greater tension concentrically disposed about valve stem 27. Valve stem 27 is threaded, as shown, to receive a nut 28 at the upper end and an adjusting nut 29 at the lower end. Coil spring 26 is disposed between the underside of collar 21 and adjusting nut 29, whereby, by adjusting the latter, the tension of the spring may be varied, as desired. Valve stem 27 passes through a slightly enlarged opening 32 in collar 21 and receives nut 28 within a pocket 35 in collar 21. A depending sleeve 30 may separate coil springs 23 and 26.

Spring 23 normally tends to hold valve 9 open and bellows 11 extended as shown in Fig. 2. This action is accomplished by permitting the lower end of spring 23 to abut against the fixed packing nut 24 and the upper end to abut against shoulder 22 of collar 21. Consequently collar 21 is urged upwardly against plate 16 of the movable end of bellows 11. Obviously, spring 23 will not be compressed until pressure is created in chamber 10 to contract the upper movable end of bellows 11. Such pressure will seat valve 9, whereupon, the continuing contraction of bellows 11 will continue to depress collar 21 and overcome the tension of spring 26. Valve stem 27 remaining stationary, the collar then moves downwardly along the stem, thereby bringing nut 28 upwardly into chamber 35, as shown in Fig. 3.

The relative tension of spring 23 and 26 provide the lost motion connection whereby the bellows may continue to contract, or move, after valve 9 is seated. The purpose of providing spring 26 stronger than spring 23 is to allow spring 23 to be first compressed to seat valve 9, so that with this valve seated, the pressure will thereafter act directly on spring 26 and allow relative motion between the valve stem 27 and the bellows 11. Those skilled in the art will readily appreciate that a yieldable or lost motion connection for accomplishing the purpose herein described may be obtained in various ways, but I have found that the arrangement disclosed affords a very simple, efficient and economical structure. Adjusting nut 29 readily allows placing any desired tension on spring 26 so that the pressure in chamber 10 will not be effective to overcome the same until valve stem 27 has been given its predetermined stroke. In the same device, this stroke may vary at times due to expansion and contraction caused by temperature variations, say, where valve 9 controls a passage for a heating medium. Obviously therefore, without this lost motion connection, it would be difficult to assure a tight seat for the valve 9. The lost motion connection described allows the difference or variation in the stroke of the valve 9 at different times, to be readily taken up by the action of the springs 23 and 26.

It will be further observed that the thermal element comprising the bellows 11, housing 12 and heating element 17 may be made as a unit capable of adaptation to different control devices, between which and the thermal unit any suitable lost motion connection may be provided to assure seating of the valve, irrespective of variation in its stroke, as well as readily permitting continued contraction or movement of the thermal element, thereafter, to compensate for any variation in the stroke.

The above described mechanism for operating inlet valve 9 may be suitably arranged within any form of desirable housing. Inlet valve connection 3 may be any of the many types provided for this purpose. Valve stem 27, carrying valve 9, will extend upwardly through any suitable packing into casing 38, to which is fastened the ring plate 14. Above plate 14 may be disposed a cylindrical housing 39 having a cap 40. If so desired, a conduit connection 41 may be attached to one side of housing 39 in any suitable manner to permit conductors 20 to be led through an opening 42 in this housing to connect with terminal bands 19 of heat coil 8. I have found that it may be desirable to provide, within certain limits, a circulation of air within housing 39 so that heat will not accumulate therein and cause an unnatural action of thermal element 7. To this end, a series of openings 43 are provided at the lower end and cooperating openings 44 furnished in the upper end of housing 39 whereby the cool air may be drawn through openings 43 and discharged through openings 44. Consequently, the volatile fluid will be influenced only by heat generated, or developed, at heat coil 8 each time the thermostatic circuit 4 is closed by thermostat 5.

Bellows 11 need not necessarily contract upon development of pressure in chamber 10, but it has been found that the life of the metal used therein is decidedly prolonged by an application of the pressure against the exterior of the bellows instead of within the bellows as has been previously suggested in certain instances. Those skilled in the art, however, will appreciate that the utility of the lost motion connection disclosed herein may be aptly associated with the thermal element in either instance. Compressing the bellows by pressure in chamber 10 does not tend to distort or stretch the metal.

On the other hand, the arrangement of the thermal element 7 may be varied without departing from the scope of the invention. In so far as the adaptation of the lost motion connection is concerned, any form of movement of the thermal element is contemplated whether it is secured by contraction or expansion. I have found, however, that contraction of the bellows has certain advantages over expansion.

Various modifications of the details and arrangements may be made without departing from the spirit and scope of the invention.

I claim:

1. The combination of a valve, an electrically actuated expansion motor for operating said valve, a valve stem projecting from said valve and arranged for movement by said motor, adjustable and fixed abutments on the free end of said valve stem, a pair of differentially compressible springs on said valve stem, and a member movable by said motor and cooperating with said abutments and said springs, said member being arranged upon said stem and slidable therealong between said abutments.

2. The combination with a control member, an electrically actuated expansion motor for operating said control member, a stem projecting from said control member and arranged for movement by said motor, a member movable by said motor and having an opening therein into which the free end of the stem extends, an abutment on said stem disposed above said opening in said member, a second abutment on said stem arranged in spaced relation with respect to the first abutment whereby said member is adapted to move along said stem between said abutments, a spring concentrically arranged on said stem adapted to be compressed by said motor through the movement of said member, a second spring concentrically arranged on said stem, and a substantially annular depending skirt movable with said member between said springs.

In witness whereof, I have hereunto subscribed my name.

LAWRENCE M. PERSONS.